3,639,423
TRICYCLIC AMINOMETHYL DERIVATIVES
Werner Winter and Max Thiel, Mannheim, Kurt Stach and Wolfgang Schaumann, Mannheim-Waldhof, and Annemarie Ribbentrop, Mannheim, Germany, assignors to Boehringer Mannheim Gesellschaft mit beschrankter Haftung
No Drawing. Filed Dec. 11, 1967, Ser. No. 689,319
Claims priority, application Germany, Dec. 23, 1966, B 90,455
Int. Cl. A61k 27/00; C07d 9/00, 65/16
U.S. Cl. 260—328                   4 Claims

ABSTRACT OF THE DISCLOSURE

Novel compounds possessing valuable pharmacological properties and useful as muscle relaxants, tranquilizing agents, anti-convulsives, etc. are disclosed. The compounds are defined by the following formula:

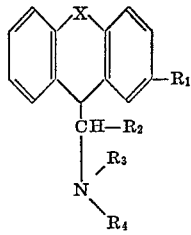

wherein X is sulfur, oxymethylene, thiamethylene, thiaethylene, iminomethylene, propylene - 1,3 or alkylated iminomethylene; $R_1$ is hydrogen, lower alkyl, halogen, alkoxy trifluoromethyl, or alkyl mercapto and $R_2$, $R_3$ and $R_4$ are each hydrogen or lower alkyl; or a physiologically acceptable acid addition salt thereof.

There are also disclosed compositions containing the above compounds as active ingredient and methods of using the same.

---

This invention relates to tricyclic aminomethyl derivatives, to their acid addition salts and to processes for making and using the same.

The new and valuable tricyclic aminomethyl derivatives according to the present invention, correspond to the following formula:

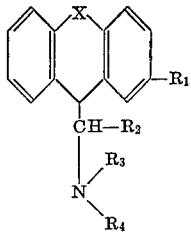

wherein X is sulfur, oxymethylene, thiamethylene, thiaethylene, iminomethylene, alkylated iminomethylene or propylene-1,3; $R_1$ is hydrogen, lower alkyl, halogen, alkoxy, trifluoromethyl or alkylmercapto and $R_2$, $R_3$ and $R_4$ which may be the same or different, are each hydrogen or straight or branched-chain lower alkyl and the salts thereof with physiologically compatible acids.

It has been found that compounds of the Formula I wherein X is sulfur or oxymethylene, $R_1$ and $R_4$ are each hydrogen, and $R_2$ and $R_3$ are each hydrogen or methyl constitute a preferred group of compounds having proved to be of great therapeutical value for their relaxant, tranquilizing and anticonvulsant effect.

The new compounds of this invention are useful in the preparation of medicinal agents. The compounds are useful because of their valuable pharmacological properties, particularly for their muscle-relaxing, tranquilizing, anti-spasmodic, anti-convulsive and other pharmacodynamic actions.

The compounds according to the present invention can be prepared by the conventional methods. Thus, for example, either:

(a) A carboxylic acid having the following formula:

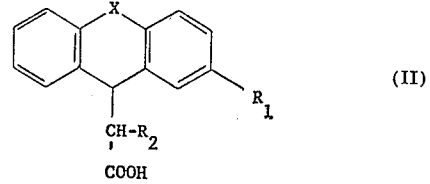

wherein $R_1$, $R_2$ and X have the same definitions as set out above, or a reactive derivative thereof, is subjected to a rearrangement reaction proceeding via the isocyanate; the amine obtained corresponding to Formula I, in which $R_3$ and $R_4$ are both hydrogen is, if desired, subsequently alkylated; or (b) A nitrogen-containing functional derivative of a carbonyl compound having the following formula:

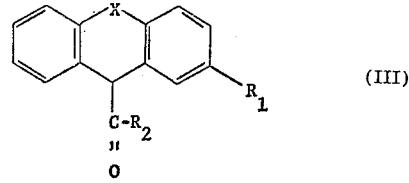

wherein $R_1$, $R_2$ and X have the same significances as set out above, is reduced and when $R_3$ and/or $R_4$ in the product obtained is hydrogen, the product is, if desired, subsequently alkylated; or (c) When $R_2$ in the product is hydrogen, a nitrile of the formula:

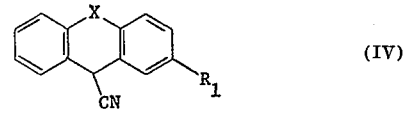

wherein $R_1$ and X have the same meanings as given above, or the corresponding carbonamide is reduced, if desired, thereafter alkylated, thereafter, if desired, the base (I) obtained is converted into its salt with a physiologically compatible acid.

As examples of rearrangement reactions taking place via isocyanates, there may be mentioned the Hofmann, Curtius, Lossen and Schmidt type rearrangement reactions. Therefore, as reactive derivatives of the carboxylic acids (II), there are preferably used:

(a) The carbonamides which, according to the Hofmann rearrangement, are reacted with an alkaline hypobromite solution;

(b) The acid azides which, according to the Curtius rearrangement, are heated in suitable solvents yielding the corresponding isocyanates, which in turn are saponified to give the amines; or (c) The hydroxamic acids or the acyl derivatives thereof which, according to the Lossen rearrangement, are heated with thionyl chloride or phosphorus pentoxide in inert solvents to produce the isocyanates, which are in turn saponified to give the amines.

According to the Schmidt rearrangement, it is also possible to start from the free acids (II) and, by heating with equivalent amounts of hydrazoic acid or sodium azide in the presence of strong mineral acids, to obtain the amines (I).

In all of the rearrangement reactions, there are initially obtained compounds (I) in which $R_3$ and $R_4$ are each hydrogen so that, if desired, the alkyl radicals $R_3$ and $R_4$ must thereafter be introduced in the known manner. This alkylation can be carried out, for example, by reaction with an alkyl halide or by reduction of a Schiff base and N-acyl derivative, which can be obtained, for example, by reacting the amines (I) with an aldehyde or ketone or with a carboxylic acid chloride, acid anhydride or the like, respectively.

By nitrogen-containing functional derivatives of the carbonyl compounds (III), there are, in particular, to be understood the Schiff's base or aldehyde-ammonia compounds, the hydrazones and the oximes. In some cases, these derivatives can first be prepared by reacting the free carbonyl compounds (III) with an amine, hydrazine, hydroxylamine or the like, the reaction product, without isolation, is then subjected directly to the reduction reaction. However, these starting materials can also be prepared in other ways and used in isolated form. The reduction of these compounds is carried out, for example, by catalytic hydrogenation or by reaction with a complex metal hydride. Further variants of the process are the reaction of the free carbonyl compounds (II) with ammonium formate according to the Leuckart-Wallach reaction or the reduction of the oximes with an alkali metal as for example, with sodium in liquid ammonia. In the case of most of these reactions, there are obtained compounds (I) in which $R_3$ and $R_4$ are each hydrogen so that, if it is desired to obtain the corresponding compounds (I) in which $R_3$ and $R_4$ are alkyl, it is necessary, as already described above, to thereafter carry out an N-alkylation. However, in such cases, it is preferable to reduce, as nitrogen-containing functional derivatives, the appropriately substituted Schiff's bases, which are formed by the reaction of the free carbonyl compounds (III) with amines having the formula $R_3 \cdot NH \cdot R_4$, wherein $R_3$ and $R_4$, which may be the same or different, are hydrogen or straight or branched-chain lower alkyl radicals.

The reduction of the nitriles (IV) or of the corresponding carbonamides can be carried out either by catalytic hydrogenation in the presence of catalysts such as palladium charcoal or by reaction with complex metal hydrides, preferably lithium aluminum hydride, whereafter, if desired, the products obtained are subsequently alkylated.

The amines obtained according to methods (a), (b) and (c) are isolated either as the free bases or as salts with pharmacologically compatible acids. Therefore, if desired, the free bases can be subsequently converted, in the known manner into their salts.

The resulting therapeutically valuable tricyclic aminomethyl derivatives may, if desired, be converted into their acid addition salts, for example, by means of suitable inorganic acids such as hydrochloric, hydrobromic, sulfuric, phosphoric, sulfamic, boric etc., or suitable organic acids such as tartaric, citric, acetic, benzoic, maleic, malic, lactic, and related acids, which are non-toxic in dosages at therapeutic levels.

The carboxylic acids (II) used as starting materials can be obtained by the reaction of a ketone having the formula:

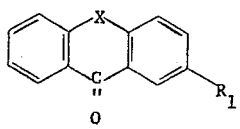

(V)

wherein $R_1$ and X have the same definitions as given above, with a fatty acid ester, as for example, tert.-butyl acetate, in the presence of an alkaline condensation agent, dehydration and saponification, as for example, with glacial acetic acid/6 N hydrochloric acid and the intermediate products so obtained hydrogenated, for example, catalytically or with amalgamated aluminum.

The carbonyl compounds (III) used as starting materials can be obtained, for example, by the Wagner-Meerwein rearrangement of glycols having the following formula:

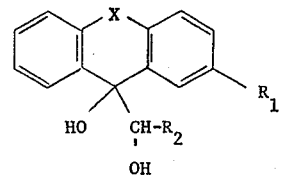

(VI)

wherein $R_1$, $R_2$ and X have the same definitions as given above; the glycols (VI) being obtainable by the oxidation of the known compounds having the following formula:

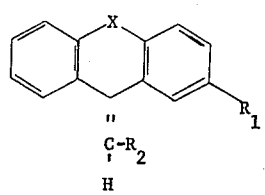

(VII)

wherein $R_1$, $R_2$ and X have the same significances as set out above.

The nitriles (IV) used as starting materials can be obtained by the reaction of tricyclic halogen compounds of the formula:

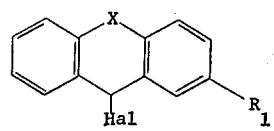

(VIII)

wherein X and $R_1$ have the same meanings as given above and Hal is halogen, preferably chlorine, with a cyanide, for example sodium cyanide or copper cyanide. The corresponding carbonamides can be obtained by partial hydrolysis of the nitriles.

The following examples are given for the purpose of illustrating the present invention and are in no wise to be construed as a limitation thereof.

EXAMPLE 1.—9-AMINOMETHYL-THIAXANTHENE

Variant a 12.8 g. thiaxanthyl-9-acetic acid (0.05 mol) were boiled for 2 hours with 7.3 ml. thionyl chloride (0.1 mol) in 50 ml. chloroform. The reaction mixture was then evaporated, the residue taken up in 100 ml. toluene and mixed with 6.5 g. sodium azide (0.1 mol). The resulting reaction mixture was then boiled under reflux for 5 hours, the insoluble material filtered off with suction, the filtrate mixed with 50 ml. concentrated hydrochloric acid and boiled for 45 minutes. After cooling, the precipitated hydrochloride was filtered off with suction and recrystallized from isopropanol. There were thusly obtained 10 g. (76% of theory) 9-aminomethyl-thiaxanthene hydrochloride, which had a melting point of 258–260° C.

Variant b 24.2 g. thiaxanthene-9-carboxylic acid (0.1 mol) were boiled for 2 hours with 14.6 ml. thionyl chloride (0.2 mol) in 100 ml. chloroform. The reaction mixture was thereafter evaporated, the residue taken up in toluene, mixed with about 50 ml. liquid ammonia, allowed to stand overnight, filtered with suction and the filtrate evaporated. The amide thus formed was taken up in 100 ml. tetrahydrofuran and added dropwise to 0.1 mol lithium aluminum hydride. Following the careful addition of 0.05 mol aluminum chloride, the reaction mixture was boiled for 4 hours, and, after cooling, the excess complex hydride which had formed was decomposed by the addition of a saturated solution of sodium chloride. Following extraction with ether, there was recovered, in 52% yield, 9-aminomethyl-thiaxanthene, which was isolated in the form of its hydrochloride and had a melting point of 258–259° C.

EXAMPLE 2.—11-AMINOMETHYL-6,11-DIHYDRO-DIBENZO-[b.e]-OXEPINE

Variant a 280 g. potassium hydroxide were dissolved in 1600 ml. water and mixed with 16.3 ml. bromine. Into this freshly prepared hypobromite solution, there were introduced 80 g. (0.32 mol) 11-carboxamido-methyl-6,11-dihydro-dibenzo-[b,e]-oxepine (M.P. 140–141° C.). The resulting reaction mixture was stirred for 3 hours at ambient temperature and thereafter heated to 100° C. for 15 minutes. The basic material was extracted with ether, converted into the hydrochloride and recrystallized from isopropanol. There were thusly obtained 55 g. (66.7% of theory) 11 - aminomethyl-6,11-dihydro-dibenzo-[b,e]-oxepine hydrochloride, which had a melting point of 277–279° C.

Variant b 0.1 mol 11-cyano-6,11-dihydro-dibenzo-[b,e]-oxepine was dissolved in tetrahydrofuran, mixed with 0.1 mol lithium aluminum hydride and 0.05 mol aluminum chloride and boiled for 3 hours. Following the addition of water, the reaction mixture was extracted with ether. There was isolated from the ether extracts, in 65% yield, 11-aminomethyl - 6,11-dihydro-dibenzo-[b,e]-oxepine hydrochloride, which had a melting point of 276–279° C.

The 11-cyano-6,11-dihydro-dibenzo-[b,e]-oxepine used as starting material was prepared in the following manner:

13 g. 11-hydroxy-6,11-dihydro-dibenzo-[b,e]-oxepine were dissolved in 100 ml. ether and mixed, at a temperature of 5–10° C., with 7.5 g. thionyl chloride and 10 ml. ether. The reaction mixture was allowed to stand for 2 hours at ambient temperature and then evaporated in a vacuum. The evaporation residue was dissolved in 100 ml. benzene and boiled under reflux for 3 hours with 11 g. cuprous cyanide. The reaction mixture was thereafter filtered and the filtrate evaporated. The resulting residue was dissolved in 15 ml. ether, mixed with 20 ml. ligroin and activated charcoal and filtered. Following the addition of further amounts of ligroin to the filtrate, 11-cyano-6,11-dihydro-dibenzo-[b,e]-oxepine precipitated out and was recovered in a yield of 9.6 g. (71% of theory) and had a melting point of 56–57° C.

EXAMPLE 3

11-(1-aminoethyl)-6,11-dihydro-dibenzo-[b,e]-oxepine 46 g. 98% formic acid were mixed, under cooling, with 55 ml. concentrated ammonia solution. The solution was then evaporated and the residue heated to 160° C. To the melt thus obtained there were added 10 g. 11-acetyl - 6,11 - dihydro - dibenzo - [b,e] - oxepine and the reaction mixture heated at 190° C. for 12 hours. The cooled mixture was dissolved in 200 ml. of isopropanol and, after the addition of 70 ml. 6 N hydrochloric acid, boiled under reflux for 10 hours. The resulting reaction mixture was thereafter mixed with a large volume of water and extracted with ether. The ethereal solution was extracted with dilute hydrochloric acid and the aqueous phase, after having been rendered alkaline, again extracted with ether The ether extract was evaporated and the residue triturated with 2 N hydrochloric acid. Following separation of the first hydrochloride fraction, the mother liquor was evaporated, a further fraction thus being obtained. There were recovered 6.2 g. (53% of theory) 11 - (1 - aminoethyl) - 6,11 - dihydro - dibenzo-[b,e]-oxepine hydrochloride, which had a melting point of 270–271° C. (decomp.).

The 11 - acetyl - 6,11 - dihydro - dibenzo - [b,e]-oxepine used as starting material was prepared by the following method:

A Grignard solution prepared from 17.8 g. magnesium and 81 g. ethyl bromide in 500 ml. ether was mixed with 77.9 g. 6,11 - dihydro - dibenzo - [b,e] - oxepine - 11-one. There were thusly obtained 57 g. 11 - hydroxy - 11-ethyl - 6,11 - dihydro - dibenzo - [b,e] - oxepine (M.P. 113–114° C.). The oxepine thus obtained was boiled for 1 hour in 200 ml. alcoholic hydrochloric acid. There were thusly obtained 46 g. 11 - ethylene - 6,11 - dihydro - dibenzo-[b,e]-oxepine (B.P. 130–135° C.). The latter compound was heated for 2 hours with 250 ml. formic acid and 30 ml. 33% hydrogen peroxide yielding 11-hydroxy-11 - (1 - hydroxyethyl) - 6,11 - dihydro - dibenzo - [b,e]-oxepine which was further worked up as the crude product. The hydroxy-ethyl compound was heated for 2 hours with 120 ml. 25% sulfuric acid and the reaction mixture cooled and extracted with ether. There were thereby recovered 31 g. (35% of theory), referred to the ketone starting material, of 11 - acetyl - 6,11 - dihydro - dibenzo-[b,e]-oxepine which had a boiling point of 160–164° C./0.4 mm. Hg and a melting point of 56–57° C.

EXAMPLE 4

11-(1-methylaminoethyl)-6,11-dihydro-dibenzo-[b,e]-oxepine

A solution of 8.7 g. 11 - acetyl - 6,11 - dihydro - dibenzo - [b,e] - oxepine in 100 ml. methanol and 5 ml. methylamine was mixed portionwise with 3 g. sodium borohydride. After stirring for 1 hour at ambient temperature, the reaction mixture was boiled under reflux for 1 hour. The bulk of the methanol was evaporated in a vacuum and the residue extracted with water and 2 N hydrochloric acid. Following adjustment of the acid extract to render the same alkaline using a dilute solution of sodium hydroxide, there was formed an oil which was taken up in ether. The evaporation residue formed from the ethereal solution was distilled in a vacuum and yielded 3.2 g. (34% of theory) 11 - (1 - methylaminoethyl)-6,11 - dihydro - dibenzo - [b,e] - oxepine which had a boiling point of 144–145° C./0.1 mm. Hg.

In order to confirm the pharmacological properties i.e., muscle relaxing, tranquillizing and anti-convulsant activities, the following experimental procedures were carried out:

(1) *Anti-convulsant effect.*—The inhibition of the Cardiazol-extension spasm was evaluated as a measure of the anti-convulsant activity of the test compounds. 10 mice were used for each dose level. The test compounds were administered intraperitoneally and 30 minutes later 150 mg./kg. of Cardiazol (pentamethylene-tetrazol) was given subcutaneously. Administration of Cardiazol alone has the effect apart from the elicited tonically clonic spasms in producing an extension spasm of the hindlegs which is readily apparent to the observer. The inhibition of this latter extension spasm was determined for each of the test compounds and is reported in the table as $ED_{50}$, the latter having been calculated according to Litchfield and Wilcoxon.

(2) *Sedative effect.*—The potentiation of the narcotic effect of urethane, which is a measure of the sedative effect of a compound was determined. The procedure was carried out by injecting mice with the test compounds in varying amounts s.c. 15 minutes thereafter 1 g./kg. of urethane was given intraperitoneally. The above amount of urethane constitutes a sub-narcotic dose, as a result of which animals who have received no further medication will merely assume a side reclining position. The doses of the test compounds were determined which after an additional 15 minutes caused 50% of the experimental animals to assume a back-reclining position ($ED_{50}$).

(3) *Tranquillizing effect.*—The inhibition of the fighting instinct in mice under prescribed conditions is considered as indicative of the tranquillizing effect of a test compound. Adult male mice which have been isolated for an extended period of time will attack any other male mouse placed in the same cage (Yen, Stanger & Millman, J. Pharmakol Exper. Therap. 122, 85A (1958)).

Male mice weighing at least 20 g. each were placed in separate cages. On the third and fourth day of such isolation, they were on two separate occasions confronted with a strange mouse, so, called "intruder." Those mice which attacked the "intruder" within one minute were selected for use in the experiments. The test compounds were administered in increasing dosages to groups of ten mice selected in accordance with the foregoing. The doses of the test compound which produced in 50% of the mice an inhibition of the fighting instinct were then determined ($ED_{50}$).

(4) *Muscle-relaxing effect.*—($LD_{50}/ED_{50}$ inclined plane).

The toxicity was determined as $LD_{50}$ (mg./kg. intraperitoneal) 24 hours after injection of the test compound. Thirty minutes following the injection of test compound, the same animals were placed on an inclined plane having an angle of inclination of 80° and which was suspended by means of thin wires. The animals which slid off within one minute were designated as positive. The $ED_{50}$ was then determined according to Litchfield & Wilcoxon and the quotient for the $LD_{50}/ED_{50}$ calculated. The larger the quotient, the better is the specific muscle relaxing effect.

The following compounds were employed in the testing:

A—Miltown—2-methyl-2-(n-propyl) - 1,3 - propanediol carbamate
B—9-aminomethyl-thioaxanthene
C—11-aminomethyl-6,11-dihydro-dibenzo-[b,e]-oxepine
D—11-(1-aminoethyl)-6,11-dihydro-dibenzo-[b,e] - oxepine

TABLE

[$ED_{50}$ in mg./kg. I.P. mouse]

| | | | $TD_{50}$ | | Inhibition of— | |
|---|---|---|---|---|---|---|
| | $LD_{50}$ (24 hrs.) | Inclined plane (30 min.) | $ED_{50}$ inclined plane | Urethane sleep increase (30 min.) | Fighting instinct (30 min.) | Cardiazol extension spasm (30 min.) |
| Substance: | | | | | | |
| A | 718 | 194 | 3.7 | 36 | 108 | 64 |
| B | 156 | 85 | 1.8 | 3.9 | 3.0 | 8.5 |
| C | 60 | 30 | 2 | 6 | | 5.6 |
| D | 100 | 50 | 2 | 20 | | 20 |

The following procedure exemplifies, in general terms, the process of using the compounds of the invention. A capsule or tablet or other pharmaceutical form containing an effective dose of the medicament in the solid state, for example from 0.5 to 50 mgs. is administered to the patient via the oral route every 4 to 6 hours, or more often if need be. Initially, it is sometimes desirable to give a large dose, for example, one, two or three times the above dose, in order to obtain a pronounced initial effect. With a majority of patients, a dose of from 0.5 to 10 mgs. or even 20 mgs. three to four times a day is sufficient to give the required therapeutic effect.

Alternatively the doses can be administered parenterally by intramuscular or subcutaneous injection. A water-soluble salt of the tricyclic aminomethyl derivatives is particularly useful for purposes of injection. In general, the dose required for parenteral administration is somewhat less than that required to provide an equal effect by oral administration.

The various pharmaceutical forms referred to above are prepared by methods well known to the art. For example, a solid dosage form can comprise a gelatin capsule containing a dose amount of a tricyclic aminomethyl derivative mixed with a quantity of starch or other solid pharmaceutical extending medium. Alternatively, a binder such as stearic acid or magnesium stearate can be added to the mixture of starch and drug and the whole pressed into tablet form. Parenteral dosage forms are obtained by dissolving a water-soluble salt of the active drug in water or saline solution in a concentration such that 1 cc. of the solution contains from 0.5–10 mgs. of active drug. The solution can then be filled into 1 cc. ampoules or larger multiple dose ampoules.

The following examples illustrate the preparation of suitable dosage forms.

Filled gelatin capsules can be prepared by mixing one pound of tricyclic aminomethyl derivative hydrochloride with 64 pounds of starch and filling the mixture into empty telescoping capsules of such size that each capsule contains 5 mg. of drug.

Tablets can be prepared as follows: 20 parts of tricyclic aminomethyl derivatives, 35 parts of starch, 35 parts of milk sugar, 4 parts of sodium carboxymethyl cellulose and 1 part of magnesium stearate (all parts by weight) are thoroughly mixed and the mixture is then compressed into scored 100 mg. tablets, each tablet containing 20 mg. of the active drug.

Ampoules containing an injectable solution are prepared as follows: 50 liters of a solution containing 5 mg. per ml. of tricyclic aminomethyl derivative in the form of its hydrochloride salt is prepared in distilled water, and 5 mg. of sodium chloride per ml. are dissolved therein to provide a substantially isotonic solution. The solution is sterilized by filtering it through a Seitz filter, and is then filled with aseptic technique into 1 cc. ampoules.

What is claimed is:

1. A tricyclic amino-methyl derivative selected from the group consisting of compounds corresponding to the formula

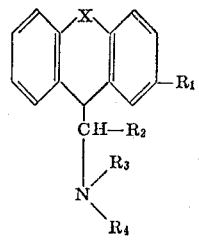

wherein X is oxymethylene, $R_1$ and $R_4$ are each hydrogen and $R_2$ and $R_3$ are each a member selected from the group consisting of hydrogen and methyl.

2. A tricyclic aminomethyl derivative according to claim 1 designated 11-aminomethyl-6,11-dihydro - dibenzo[b,e] oxepine.

3. A tricyclic aminomethyl derivative according to claim 1 designated 11-(1-aminoethyl)-6,11-dihydro - dibenzo[b,e]oxepine.

4. 9-amino-methyl thiaxanthene.

(References on following page)

References Cited

UNITED STATES PATENTS 2,368,006 1/1945 Cusic _____ 260—293

OTHER REFERENCES

Cataneo et al., C.A. 59:12749–50 (1963).

HENRY R. JILES, Primary Examiner
C. M. SHURKO, Assistant Examiner

U.S. Cl. X.R.

260—239 D, 327 B, 333, 570.8 TC, 570.9; 424—244, 275, 278, 330